United States Patent
Waggoner

[19]

[11] Patent Number: 5,863,059
[45] Date of Patent: Jan. 26, 1999

[54] TRACTOR HAULING METHOD AND APPARATUS

[76] Inventor: Wayne M. Waggoner, P.O. Box 31357, Billings, Mont. 59107

[21] Appl. No.: 893,881

[22] Filed: Jul. 11, 1997

[51] Int. Cl.⁶ ..................................................... B60P 3/06
[52] U.S. Cl. ........................................... 280/402; 280/493
[58] Field of Search ............................... 280/402, 411.1, 280/412, 493

[56] References Cited

U.S. PATENT DOCUMENTS

| | | |
|---|---|---|
| 3,715,042 | 2/1973 | Rellinger . |
| 4,149,643 | 4/1979 | Skala et al. . |
| 4,152,006 | 5/1979 | Dunlap . |
| 4,544,175 | 10/1985 | Hubert ..................................... 280/402 |
| 4,555,214 | 11/1985 | Morton ..................................... 280/402 |
| 4,708,358 | 11/1987 | Gehman et al. . |
| 5,249,911 | 10/1993 | Marola . |
| 5,722,677 | 3/1998 | Licther et al. ........................... 280/402 |

Primary Examiner—J. J. Swann
Assistant Examiner—Michael Cuff
Attorney, Agent, or Firm—Richard C. Conover

[57] ABSTRACT

A method and apparatus for towing disabled truck tractors including a towing bar connected to a disabled tractor's fifth-wheel hitch. The towing bar is positioned on the disabled tractor to extend in a rearward direction, downwardly inclined from the hitch pin toward the rear of the disabled tractor. A spreader bar is chained across the towing bar to hold the towing bar down when upward pressure is applied to the towing bar. A lifting bar is provided which is connected to a fifth-wheel hitch on the towing tractor. The lifting bar is positioned on the towing tractor to extend in a rearward direction, downwardly inclined away from the hitch pin. The downwardly inclined end of the towing bar is placed on the top of the downwardly inclined end of the lifting bar. As the towing tractor is backed toward the disabled tractor, the towing bar will ride up the incline plane provided by the lifting bar. Once the towing bar is secured, the towing tractor can then drive forward, pulling the disabled tractor with it's rear wheels lifted off of the ground.

4 Claims, 4 Drawing Sheets

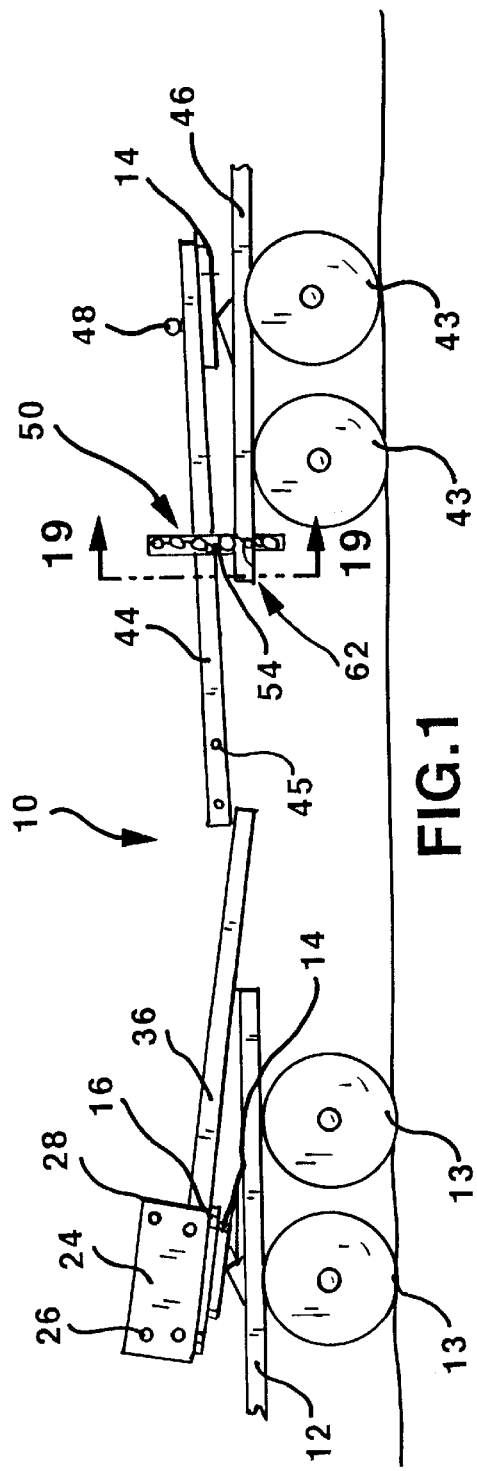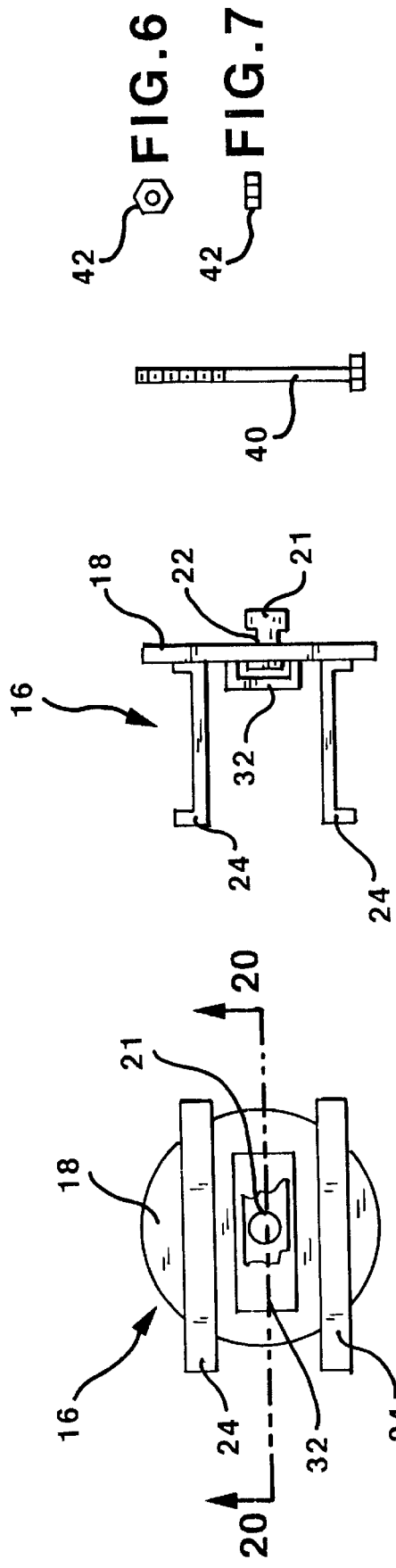

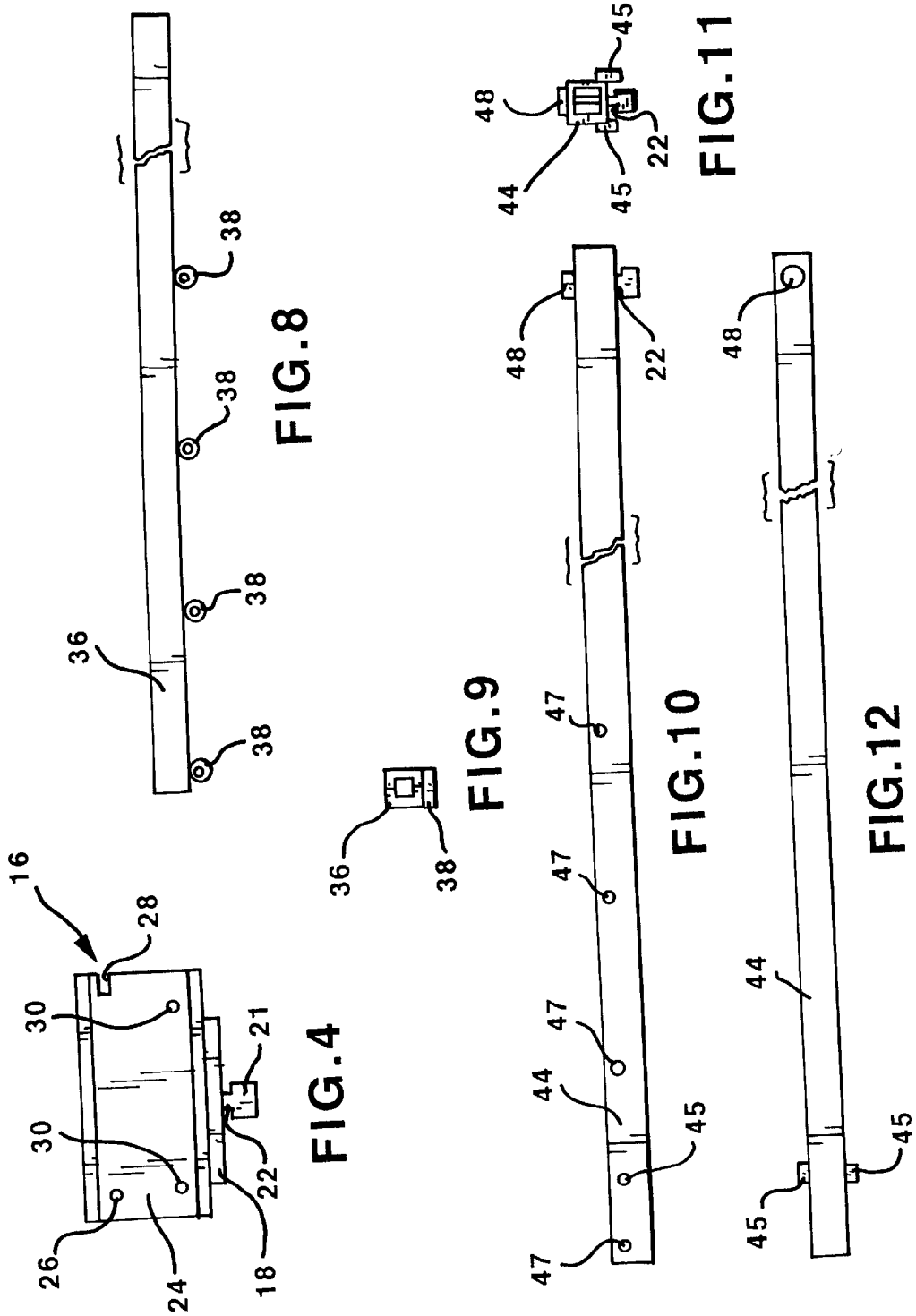

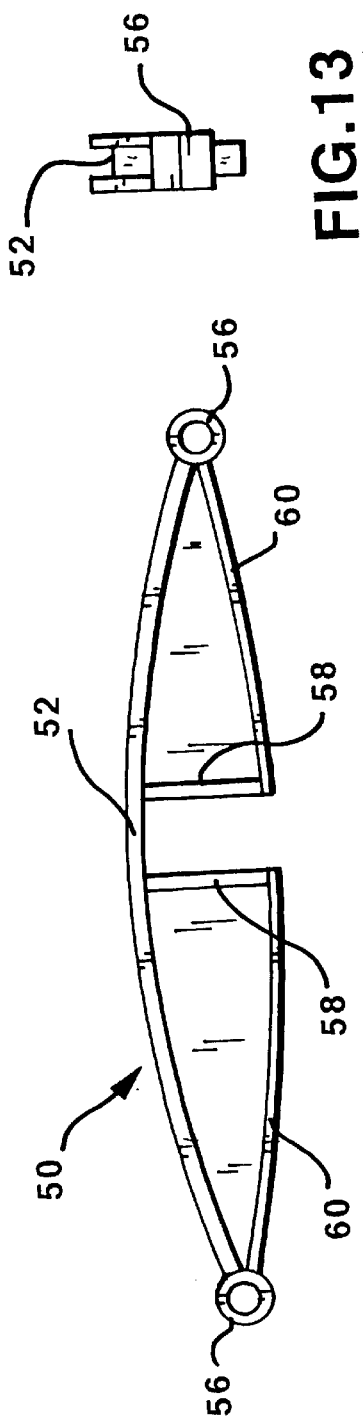

TRACTOR HAULING METHOD AND APPARATUS

SPECIFICATION

Background of the Invention

The present invention relates to a truck tractor hauling method and apparatus that can be used with a towing truck tractor to tow a disabled truck tractor. In a preferred embodiment, both tractors have available conventional fifth-wheel hitches. If these hitches are not available, conventional adaptors could also be used.

Truck tractor towing devices have usually included booms of various descriptions mounted on a towing tractor to tow a disabled tractor. For instance, see U.S. Pat. No. 4,152,006, U.S. Pat. No. 3,715,042, or U.S. Pat. No. 5,249,911 for examples of apparatus which have a single boom, together with associated pneumatic or hydraulic lifting mechanisms, mounted on the towing tractor. After the boom is locked into place, the pneumatic or hydraulic lifting mechanism raises the end of the boom connected to the disabled tractor upward, so that one end of the disabled tractor is raised off the roadbed. The disabled tractor can then be easily towed.

In addition, there have been other towing devices which use a single boom with king pins mounted adjacent each end for locking the boom between the fifth-wheel hitch of the towing tractor and the fifth-wheel hitch of the disabled tractor. For instance, see U.S. Pat. No. 4,149,643 and U.S. Pat. No. 4,708,358. The first of these patents illustrates a winch assembly associated with a boom which raises the rear of a disabled tractor, while the second patent illustrates a hydraulic mechanism for raising a boom connected to the fifth-wheel hitch of a disabled tractor.

From the above it can be seen that eliminating the lifting means, be it winch, hydraulic, or pneumatic lifters, could simplify a towing mechanism for disabled truck tractors. For this reason, it appears that what is needed is an apparatus that does not depend on a separate, mechanical, lifting means installed on the towing truck tractor to raise the rear of a disabled truck tractor, but rather an apparatus that depends upon the energy available in tractor movement, as a towing tractor backs toward a disabled tractor, to lift the rear end of the disabled tractor for towing.

SUMMARY OF INVENTION

The present invention relates to a method and apparatus for towing disabled truck tractors.

A towing bar, provided with a hitch pin at one end, is connected, by using the hitch pin, to a disabled tractor's fifth-wheel hitch. The towing bar is positioned on the disabled tractor to extend in a rearward direction, downwardly inclined from the hitch pin end toward the rear of the disabled tractor.

A spreader bar is chained across the towing bar adjacent the back of the disabled tractor to hold the towing bar in line along the fore-aft axis of the disabled tractor, and to hold the towing bar down when upward pressure is applied to the towing bar.

A lifting bar is provided which is connected with a hitch pin to a fifth wheel hitch on the towing tractor. The lifting bar is positioned on the towing tractor to extend in a rearward direction, downwardly inclined away from the hitch pin. The towing bar is sized to extend beyond the rear of the towing tractor. In this position, the towing bar rests on the frame of the towing tractor.

When the method of this invention is to be used, the two tractors are opposingly aligned aft to aft and spaced apart just slightly less than the combined length of the lifting and towing bars. The downwardly inclined end of the towing bar is placed on top of the downwardly inclined end of the lifting bar. As the towing tractor is backed toward the disabled tractor, the towing bar will ride up the inclined plane provided by the lifting bar. A pair of lugs are secured on opposite sides of the towing bar and spaced apart sufficiently to accept the lifting bar between them. Whenever the downwardly inclined end of the towing bar is placed over the downwardly inclined end of the lifting bar, the two lugs function to guide the inclined towing bar along the top of the inclined lifting bar as the towing bar slides along and over the lifting bar. With this arrangement, the towing bar is prevented from slipping off the lifting bar during this over-riding motion.

As the towing tractor backs toward the disabled tractor, the towing bar rides up the inclined lifting bar causing the rear of the disabled tractor to be lifted, because the spreader bar prevents the towing bar from lifting away from the disabled tractor frame. This movement continues until the sliding towing bar encounters a stop mechanism on the lifting bar. Once this encounter has been made, sliding motion between the two bars stops. A bolt is then inserted through aligned holes in the towing and lifting bars to lock the two bars together for towing. The towing tractor can then drive forward, pulling the disabled tractor with its rear wheels lifted off of the ground.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 1 is an elevational view of a tractor hauling apparatus according to the present invention;

FIG. 2 an enlarged top view with parts broken away of a turn table fitting shown in FIG. 1;

FIG. 3 is a right side view of the turn table spacer shown in FIG. 2;

FIG. 4 is an elevational view of the turn table fitting shown in FIG. 2;

FIG. 5 is an elevational view of a pin shown in FIG. 1;

FIG. 6 is a top view of a nut for screwing onto the pin shown in FIG. 5;

FIG. 7 is an elevational view of a nut shown in FIG. 6;

FIG. 8 is an elevational view of a lifting bar shown in FIG. 1;

FIG. 9 is a left end view of the lifting bar shown in FIG. 8;

FIG. 10 is an elevational view of a towing bar shown in FIG. 1;

FIG. 11 is a right side view of the towing bar shown in FIG. 10;

FIG. 12 is a bottom view of a tow bar shown in FIG. 10;

FIG. 13 is an elevational view of a spreader bar shown in FIG. 1;

FIG. 14 a left side view of the spreader bar shown in FIG. 13;

FIG. 15 is a partial view of a chain used with the spreader bar and frame bracket and shown in FIG. 1;

FIG. 16 is an elevational view of a frame bracket shown in FIG. 1;

FIG. 17 is a left side view of the frame bracket shown in FIG. 16.

FIG. 18 is a bottom view of the frame bracket shown in FIG. 16;

DESCRIPTION OF A PREFERRED EMBODIMENT

Figure 19:
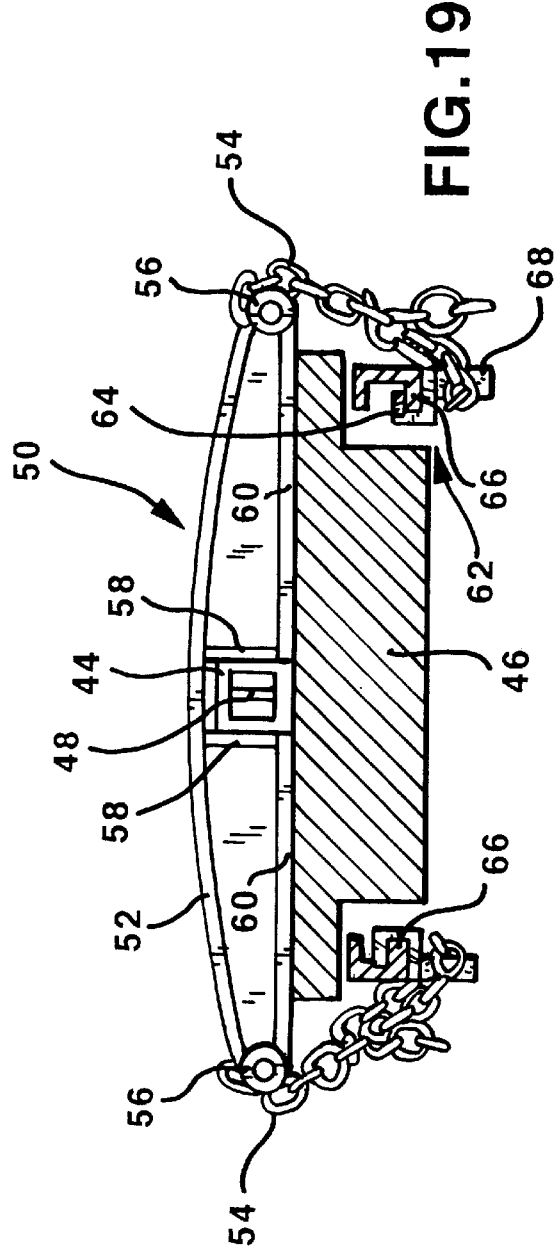
FIG. 19 is a cross-sectional view of the rear of a disabled tractor taken along the line 19—19 in FIG. 1 with some background parts broken away.

A preferred embodiment of a tractor hauling apparatus 10 is shown in FIG. 1. A towing truck tractor 12, having rear wheels 13, commonly has a fifth wheel hitch 14 mounted on the truck for towing trailers. The present invention utilizes this fifth wheel hitch; however, when a fifth wheel hitch is not present, an adaptor device can be used to simulate this fifth wheel hitch.

The present invention includes a turn table fitting 16 which is placed over the fifth wheel hitch 14, as best seen in FIGS. 2–4 and 20. Turn table fitting 16 has a disk 18 which is positioned over the conventional fifth wheel hitch 14. A hitch pin 21, having a circumferential groove 22, is fixedly secured to disk 18. Pin 21 is inserted into the jaws of hitch 14, and the jaws grab pin 21 with groove 22 to securely hold turn table fitting 16 to the towing truck tractor.

A pair of parallel, spaced apart walls 24 are fixedly attached to disk 18. As best seen in FIG. 4, each wall 24 has corresponding holes 26 and a hole 30 therethrough. Each hole 30 is positioned a predetermined distance above disk 18. Each hole 26 is positioned a greater distance above disk 18 than holes 30. A notch 28 is provided in each wall 24, as shown in FIG. 4. Notch 28 is at the same height above disk 18 as holes 26. Holes 26 and 30, and notches 28 in opposing walls 24, are respectively aligned.

A bottom hitch pin cover 32, as shown in FIGS. 2 and 3, has an inverted "U"-shaped configuration and is attached to disk 18 as by welding. Bottom hitch pin cover 32, is sized to extend above and over hitch pin 21 when the hitch pin cover is secured to disk 18.

Figure 20:
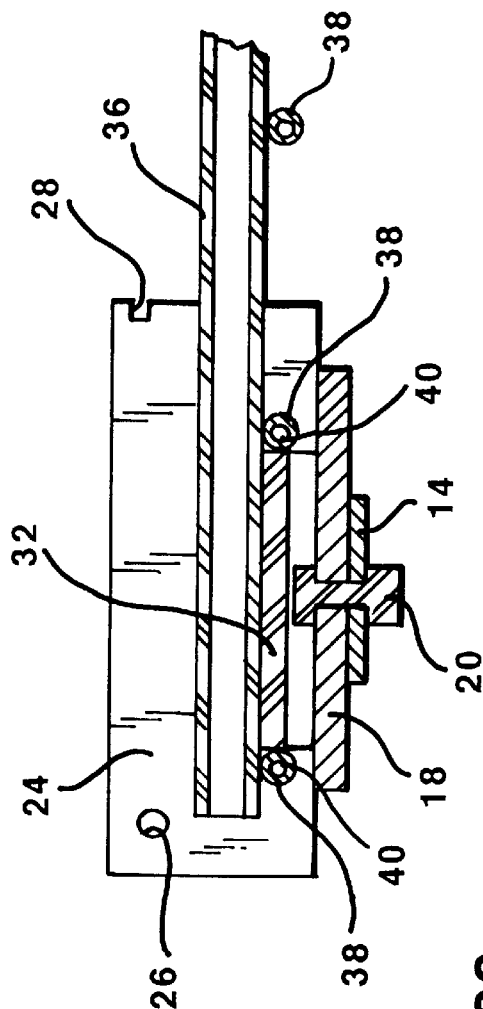
FIG. 20 is a cross-sectional view of the towing tractor end of the tractor hauling apparatus taken along the lines 20—20 in FIG. 2 with the tractor hauling apparatus fitted to a fifth wheel hitch.

A lifting bar 36, as shown in FIGS. 1 and 20, is secured to turntable fitting 16. Lifting bar 36 may be solid or a box member, as shown in FIG. 9. Pipes 38 are attached as by welding to lifting bar 36 as shown in FIGS. 8, 9, and 20. Adjacent pipes 38 are spaced apart from each other the same distance as the distance between holes 30 in walls 24. Lifting bar 36 is removably attached attached to walls 24 by positioning bar 36 between these walls and aligning a pipe 38 with a hole 30. A bolt pin 40 can be inserted through a bolt hole 30 in one wall 24, through the bore of aligned pipe 38, through bolt hole 30 in the opposite wall 24, and then secured by nut 42. A second bolt pin 40 can be inserted in the adjacent bolt hole 30, through adjacent pipe 38, and through the corresponding adjacent bolt hole 30. The second bolt pin 40 is also secured by a nut 42. This arrangement securely connects lifting bar 36 to fifth wheel hitch 14 of towing tractor 12. The pipes 38 provide an adjustment means for adjusting the length of the lifting bar 36 extending behind towing tractor 12.

As shown in FIG. 1, lifting bar 36 rests on the frame of the towing tractor and extends rearwardly away from the towing tractor in a downwardly inclined direction. Any downward pressure on the distal end of lifting bar 36 will be resisted by hitch pin 21 in fifth wheel hitch 14 and the fulcrum provided by lifting bar 36 resting on the frame of towing tractor 12.

Turning now to the disabled tractor 46, having rear wheels 43, as shown in FIG. 1, a towing bar 44 is connected to a fifth wheel hitch 14 on the disabled tractor. Towing bar 44 may be solid or a box member, as shown in FIG. 11. A hitch pin 48 is secured to one end of towing bar 44, as shown in FIGS. 1, 10, and 11. Hitch pin 48 has a circumferential groove 22 which can be grabbed by the jaws of fifth wheel hitch 14 to secure towing bar 44 to the disabled tractor.

Downwardly extending lugs 45 are provided on either side of towing bar 44, as best seen in FIGS. 10, 11, and 12, and used to guide the towing bar as it moves up lifting bar 36 to lift the disabled tractor in a manner to be described. The distance between lugs 45 is selected so that the lugs may fit on opposite sides of lifting bar 36. When towing bar 44 is placed on lifting bar 36 with lugs 45 receiving the lifting bar between them, towing bar 44 can slide along the top of lifting bar 36. Lugs 45 prevent towing bar 44 from slipping laterally off lifting bar 36. In addition, towing bar 44 has a series of spaced apart pin holes 47, as shown in FIG. 10, extending along the towing bar with adjacent holes spaced apart the same distance as that between lifting bar hole 26 and lifting bar notch 28. A bolt pin 40, inserted through one of the pin holes 47, is used to adjust the stopping point of towing bar 44 riding upon lifting bar 36 by having the bolt pin eventually engaging notch 28.

A spreader bar 50, as shown in FIGS. 1, 13, and 14, is used to hold down the towing bar 14 when the disabled tractor is towed. Spreader bar 50 includes a curved upper channel 52, as best seen in FIG. 13, for accepting a chain 54 within the channel, as shown in FIG. 19. At either end of channel 52, a transverse pipe 56 is fixedly attached. Intermediate the ends of channel 52, a pair of bar holding arms 58 extend away from the channel. One end of the bar holding arms 58 is rigidly attached to channel 52, as best seen in FIG. 14. Spacers 60 are rigidly attached between bar holding arms 58 and pipe 56. This arrangement provides strength and rigidity to the bar holding arms. Bar holding arms 58 are spaced apart from each other to accept, and confine, towing bar 44 whenever towing bar 44 is placed between the bar holding arms, as shown in FIG. 19.

Frame brackets 62, as best seen in FIGS. 1 and 16–19, are used to removably secure spreader bar 50 to the disabled tractor. The brackets 62 include a hangar 64 with a hook for grabbing frame 66 of the disabled tractor 46, as shown in FIG. 19. Each hangar 64 is also provided with a post 68 around which an end of chain 54 may be wrapped and secured. When chain 54 is laid in channel 52 and each end secured to posts 68, spreader bar 50 is secured to the disabled tractor.

As best seen in FIG. 19, spreader bar 50 is positioned over towing bar 44. Chain 54 can then be laid in upper channel 52 of spreader bar 50 and then tightened at opposite ends around posts 68 on either side of the disabled tractor 46 to hold the spreader bar relative to disabled tractor frame 66. Spreader bar 50 and frame hangars 64 keep chain 54 spaced apart from disabled tractor 46 to prevent marring or scaring during towing. At the same time, spreader bar 50 confines and holds towing bar 44 firmly along the fore-aft axis of the disabled tractor with only a small amount of vertical slack.

In operation, turn table fitting 16 is connected to fifth wheel hitch 14 of towing tractor 12 by means of hitch pin 21. At the forward end, lifting bar 36 is placed over bottom hitch pin cover 32. The length of the portion of lifting bar 36 extending rearwardly from towing tractor 12 can be adjusted by aligning different lifting bar pipes 38 with lifting bar holes 30. Once the rearwardly extending portion of lifting bar 36 is adjusted in length so that it extends downwardly away from towing tractor 12, a bolt pin 40 is inserted through a bolt hole 30, pipe 38, and a corresponding bolt hole 30 to lock the lifting bar in position. This bolt pin 40 is secured using a nut 42. A second bolt pin 40 can then be inserted in the adjacent bolt hole 30, through an adjacent pipe 38, and through the corresponding adjacent bolt hole 30. The second bolt pin 40 is also secured by a nut 42. This arrangement securely connects lifting bar 36 to fifth wheel hitch 14 of towing tractor 12. When secured, lifting bar 36 inclines downwardly rearwardly because fifth wheel hitch 14 is elevated above the rearwardly extending bed of the towing tractor. Inclined lifting bar 36 rests on the frame at the rear of towing tractor 12 so that downward pressure on the lifting bar will be resisted.

At disabled tractor 46, towing bar 44 is placed over fifth wheel hitch 14 of the disabled tractor and secured to the hitch by means of hitch pin 48. With the towing bar 44 positioned to extend rearwardly from the disabled tractor, the towing bar 44 inclines downwardly relative to disabled tractor 46 because of the added height of the fifth-wheel hitch 14 above the bed. Spreader bar 50 is then placed over towing bar 44. Frame hangars 64 are hung from the frame of disabled tractor 46. A chain 54 is then laid in upper channel 52. One end of chain 54 is led around post 68 of one of the frame brackets 62 and secured by any conventional means. On the opposite side of disabled tractor 46, the other end of chain 54 is again led around a post 68, pulled taut, and again secured by any conventional means. With this arrangement, towing bar 44 will be held extending backward along the fore-aft axis of disabled tractor 46 and inclined downwardly from fifth wheel hitch 14. With spreader bar 50 in place, there will be a small amount of vertical play between towing bar 44 and spreader bar 50 to permit towing bar 44 to be lifted onto lifting bar 36 at the start of the set-up.

A bolt pin 40 is placed in the second or greater pin hole 47, as counted from the left end of FIG. 10, and secured with a nut 42. The decision as to which hole 47 to use depends upon where towing bar 44 is to stop sliding relative to lifting bar 36. Bolt pin 40 will eventually engage lifting bar notch 28 to stop any further sliding motion between lifting bar 36 and towing bar 44 as the towing tractor is backed toward the disabled tractor.

Towing tractor 12 is then opposingly aligned with the disabled tractor with lifting bar 36 inclined downwardly toward the disabled tractor as best seen in FIG. 1. The end of also downwardly inclined towing bar 44 is then lifted onto lifting bar 36 with lugs 45 receiving lifting bar 36 between them. Lugs 45 will keep towing bar 44 aligned with lifting bar 36 whenever towing bar 44 slides over lifting bar 36 toward towing tractor 12. Lugs 45 guide towing bar 44 up along lifting bar 36 as the two tractors are brought closer together.

As towing bar 44 slides along lifting bar 36, the rear end of disabled tractor 46 will be lifted off the ground because spreader bar 50 holds towing bar 44 close to disabled tractor frame 66. When the two tractors are brought closer together, the end of towing bar 44, engaging lifting bar 36, rides up an inclined plane lifting the rear end of the disabled tractor in the process. When pin 40, in a pin hole 47 in towing bar 44, slides into lifting bar notch 28, an adjacent pin hole 47 will be simultaneously aligned with lifting bar holes 26. A bolt pin 40 is then inserted through a lifting bar hole 26 in one wall 24, aligned pin hole 47, and again through aligned lifting bar hole 26 in opposite wall 24, to securely hold towing bar 44 to the fifth wheel hitch 14 of towing tractor 12. With towing bar 44 thus securely connected to both fifth wheel trailer hitches 14, towing tractor 12 is ready to tow disabled tractor 46 in the forward direction.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A tractor hauling apparatus for pulling a disabled tractor having rear wheels with a towing tractor, the tractor hauling apparatus comprising:

a towing bar having a first hitch pin adjacent one end for connecting the towing bar to the disabled tractor;

the towing bar being positioned with an end extending in an aft direction away from the disabled tractor;

the disabled tractor having a first hitch means accepting the first hitch pin for securing the towing bar to the disabled tractor;

a holding means for holding the towing bar down against the disabled tractor;

the holding means including a spreading bar positioned over the towing bar and a chain positioned over the spreader bar and connected to the disabled tractor for preventing the towing bar from moving upwardly and away from the disabled tractor;

a lifting bar having a second hitch pin adjacent one end for connecting the lifting bar to the towing tractor;

the lifting bar being positioned with an end extending in a downwardly inclined manner in an aft direction away from the towing tractor;

the towing tractor having a second hitch means for accepting the second hitch pin of the lifting bar and for securing the lifting bar to the towing tractor;

a guiding means for slidingly guiding the towing bar with respect to the lifting bar when the towing bar is placed over and on top of the lifting bar, and a towing tractor is backed toward the disabled tractor;

the guiding means including a pair of lugs positioned on opposite sides of the towing bar and extending downwardly, the lugs are spaced apart a distance to receive the lifting bar there between, when the towing bar is placed over and on top of the lifting bar; and a locking means for locking the lifting bar to the towing bar to secure the disabled tractor to the towing tractor.

2. The tractor hauling apparatus of claim 1 wherein the spreader bar includes a channel for receiving and confining the chain when the chain is positioned on the spreader bar.

3. A method for haling a disabled tractor withh rear wheels, with a towing tractor comprising the steps of:

mounting an end of a lifting bar to the towing tractor so that the lifting bar extends in a downwardly inclined manner in an aft direction away from the towing tractor;

mounting an end of a towing bar to the disabled tractor so that the towing bar extends in a downwardly inclined manner in an aft direction away from the disabled tractor;

securing the towing bar to the disabled tractor;

positioning a spreader bar over the towing bar and positioning a chain over the spreader bar;

connecting the chain to the disabled vehicle for preventing the towing bar from moving upwardly and away from the disabled tractor;

positioning the towing vehicle with respect to the disabled vehicle in a back-to-back relation, and spaced apart a distance where the towing bar can be placed on top of the lifting bar;

positioning the towing bar on top of the lifting bar;

backing the towing tractor toward the disabled tractor whereby the towing bar slides up the downwardly inclined lifting bar lifting the rear wheels of the disabled tractor; and securing the disabled tractor, with its wheels lifted, to the towing tractor.

4. The method according to claim 3, further including the step of guiding the towing bar as it moves up the lifting bar so that the towing bar will not slip off the lifting bar.

* * * * *